Figure 1:
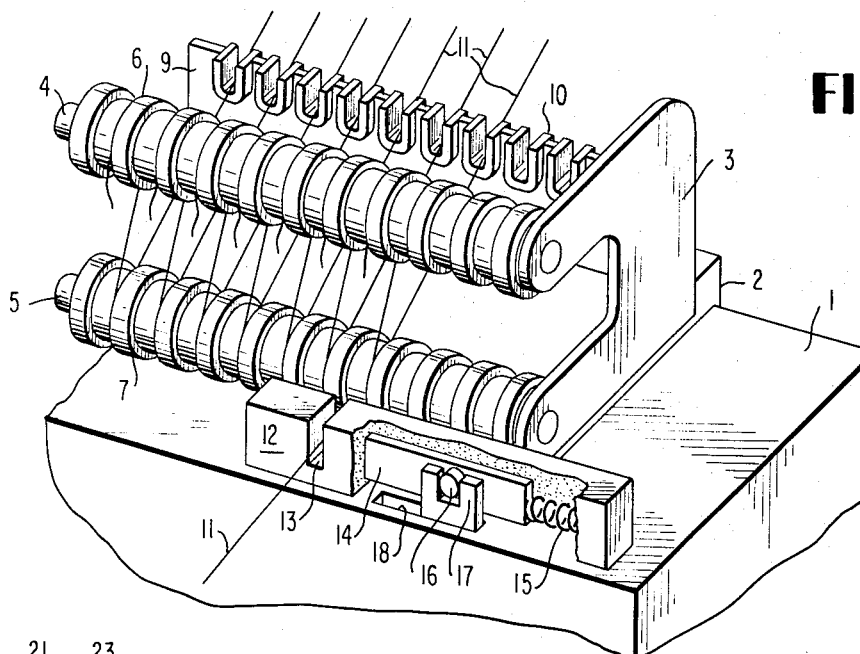

United States Patent [19]
Heusser

[11] 3,805,607
[45] Apr. 23, 1974

[54] YARN CHANGING MECHANISM
[75] Inventor: Eduard Heusser, Uster, Switzerland
[73] Assignee: Zellweger Ltd., Uster, Switzerland
[22] Filed: Aug. 27, 1971
[21] Appl. No.: 175,684

[52] U.S. Cl. .............................................. 73/160
[51] Int. Cl. ........................................... B65h 57/00
[58] Field of Search ................ 73/160, 159; 28/64; 242/36

[56] References Cited
UNITED STATES PATENTS
1,960,462  5/1934  Swanson ............................... 28/64

Primary Examiner—Richard C. Queisser
Assistant Examiner—Denis E. Corr
Attorney, Agent, or Firm—Craig and Antonelli

[57] ABSTRACT

A yarn changing mechanism for textile-testing apparatus permits selection of the output from different production stations in an automatic manner by keeping ready a number of yarns to be subjected to testing in a clamping support arrangement which is periodically indexed to place each succeeding yarn sample in turn at a selection station where the yarn may be grasped and conveyed through the testing equipment.

8 Claims, 5 Drawing Figures

YARN CHANGING MECHANISM

This invention relates in general to textile-testing apparatus for measuring the cross section of yarns, rovings and slivers, and more particularly to yarn-changing mechanisms for use in such apparatus.

In the treatment of yarn samples and more particularly, in the testing of yarns to determine their cross-sectional uniformity, testing can only be carried out on random samples because it is only possible to test a small proportion of the total amount of yarn produced and also because the tested yarn can no longer be used.

In order to obtain a selection of the output from different production stations required for the random-sample monitoring of production, different yarn packages from arbitrarily selected winding spindles have to be successively subjected to testing. The most simple, but at the same time, the most expensive method from the point of view of operation and monitoring is for each sample to be placed on a draw-off mechanism and subjected to testing and for the testing to be interrupted at the end of the testing period allocated to each sample, after which the following sample is introduced and testing continued. This means that the operator has constantly to monitor the sample-changing operation and is unable to do any other work in the meantime.

An automatically operating mechanism which automatically initiates sample changing at the end of each testing interval affords considerable functional advantages in this respect.

Accordingly, the present invention also provides a yarn-changing mechanism for keeping ready a number of yarns to be subjected to testing, comprising a clamping support in which yarns can be inserted, means for advancing the clamping unit by one clamping division each time a sample is changed so as to bring the next yarn sample into the vicinity of a yarn conveyor, and a cutting unit operable to cut through the tested yarn before the fresh yarn sample is introduced.

Figure 2:
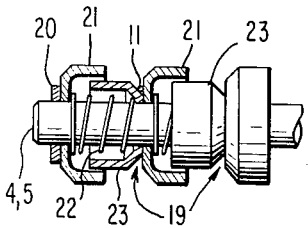
Figure 5:
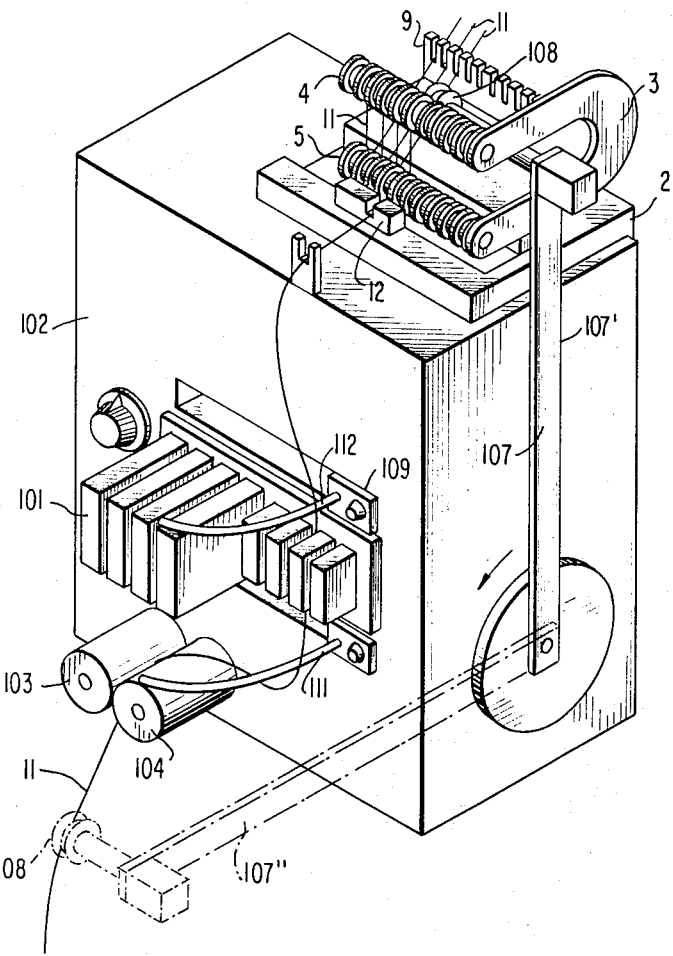
Figure 3:
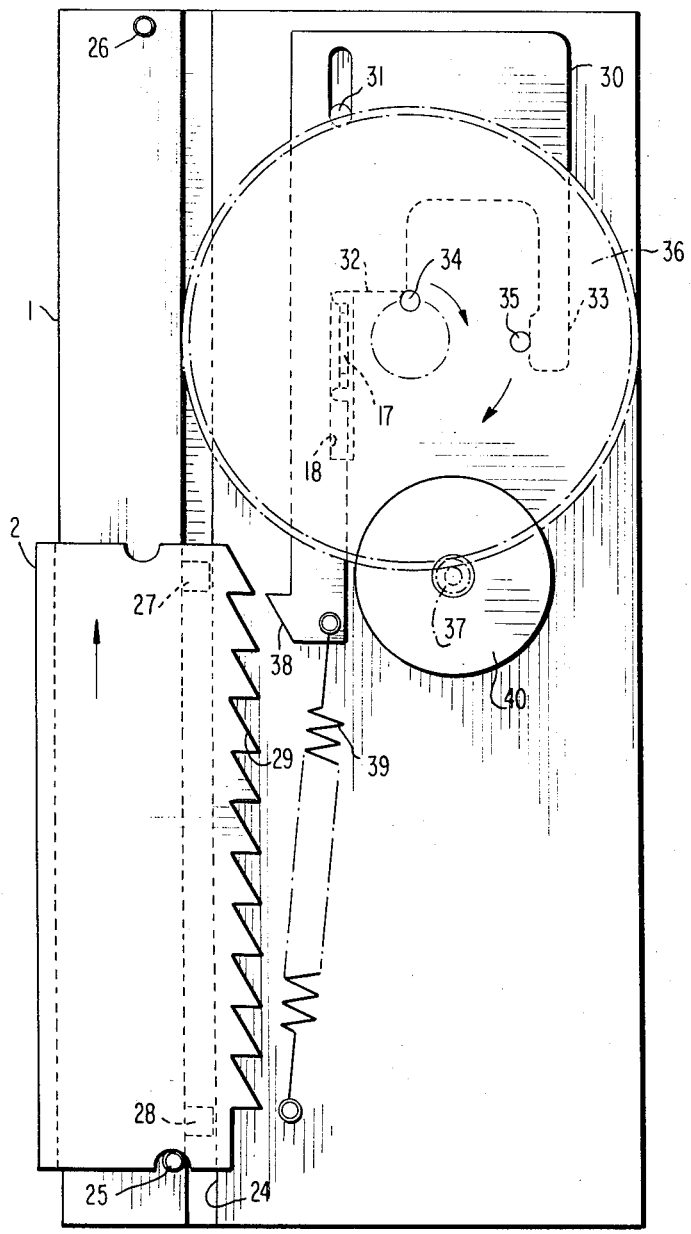
Figure 4:
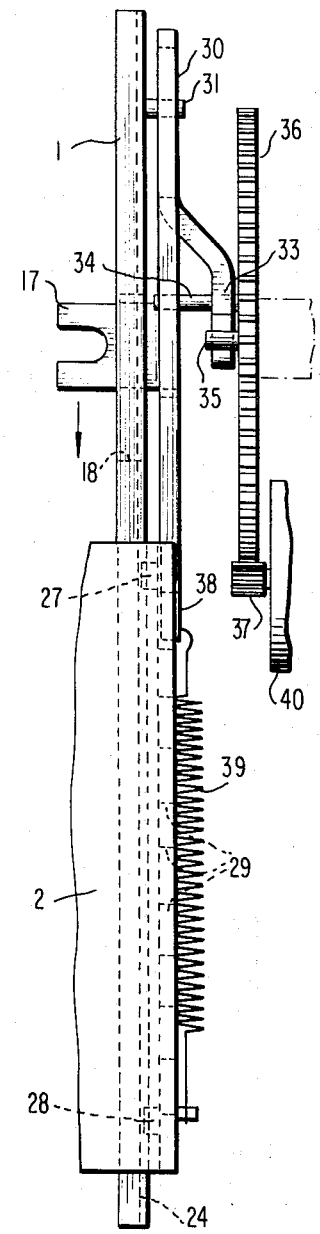

An embodiment of the invention is illustrated in the accompanying drawings, in which:

FIG. 1 is a perspective view of a clamping support and a cutting unit in accordance with this invention, FIG. 2 illustrates a structural detail of a yarn clamp, FIG. 3 is a diagrammatic bottom view of a drive mechanism for the clamping support, FIG. 4 is a side elevation of the drive mechanism, and FIG. 5 is a perspective view of a textile-testing apparatus in which the clamping support and cutting unit of the present invention may be used.

FIG. 1 illustrates a mechanism housing 1 on which is disposed a laterally displaceable clamping support consisting of a carriage 2. A supporting plate 3 is fixed to this carriage 2 and supports an upper bar 4 and a lower bar 5 to which yarn clamps 6 and 7 are fixed, respectively. The supporting plate 3 has a recess 8 into which a yarn conveyor, which forms the subject of my copending application, Ser. No. 175,683, filed Aug. 27, 1971, can swing. The carriage 2 also has a guide plate 9 with a yarn guide 10 for each yarn 11 inserted.

The carriage 2 is preceded in the direction of travel of the yarn by a cutting unit 12 through which the tested yarn 11 passes. The unit 12 has a slot 13 and a cutting blade 14 which is displaceable transversely of the direction of yarn travel. The cutting blade 14 is held open when the yarn 11 which is being tested travels through the slot 13 by means of a fork 17 displaceable in an opening 18 in the housing. A bolt 16 secured to the blade is engaged in the fork 17. At the same time, a spring 15 is placed under tension. After a given sample has been tested, the fork 17 slides to the left in the opening 18, as hereinafter described, the cutting blade 14 yields to the pressure of the spring 15 and cuts through the yarn 11 in the slot 13.

The yarn clamps themselves, which are shown in more detail in FIG. 2, comprise a number of cylinders 21 and 23 arranged in rows on the bars 4 and 5 in such a way that the cylinder 21, which is relatively large and is open to the right, receives and overlaps the cylinder 23 which is relatively small and is open to the left. The cylinders 21 and 23 have internal springs 22 which force the telescoping cylinders apart and, in doing so, close a gap 19 existing between the abutting cylinders 21 and 23. The yarn 11 is introduced into this gap 19 and held by the pressure of the springs 22. The end of the yarn clamp 6 (or 7) forms a safety plate 20 on the bar 4 (or 5).

In order to prepare for a testing cycle, the yarns 11 are taken from their bobbins through the yarn guides 10 of the guide plate 9 and introduced below the lower yarn clamp 7 and above the upper yarn clamp 6 into the corresponding gap 19 formed by displacing the cylinder 23. In the starting position, the carriage 2 is pushed so far to the left that the yarn clamp nearest the supporting plate 3 is situated behind the slot 13 of the cutting unit 12. The gripper of the conveyor swinging into the recess 8 is designed in such a way, and is positioned so that it also grips the leading yarn and, during its rotation formed out of the recess 8, places this yarn into the slot 13, as will be described later in connection with FIG. 5.

To begin testing of the second yarn, the carriage is moved forward to the right by the distance between two yarn clamps. The mechanism by which this forward movement or indexing is effected is illustrated in FIGS. 3 and 4.

The carriage 2 passes through a plate beneath the cover of the housing 1 and is displaceable on two slide blocks 27 and 28 in a guide groove 24 between striker pins 25 and 26. The leading edge of the carriage 2 is in the form of a rack 29 with sawtooth-like teeth whose pitch corresponds to one advance step to be taken for each sample of yarn. A slide 30 has a claw 38 which is engageable in the teeth of the rack 29 so that it can displace the rack 29. One end of the slide 30 is guided by a bolt 31 riding in an elongated slot and the other end is connected with a compression spring 39 which exerts a slightly laterally directed pull so that the engaging claw 38 can drop into the teeth of the rack 29.

The slide 30 is reciprocated by means of an inner control bolt 34 which projects upwards from a rotor 36 which is preferably in the form of a gearwheel. During this reciprocation, the inner control bolt 34 comes into contact with an abutment surface 32 of the slide 30 which has previously been pulled down to the left by the spring 39, as a result of which the engaging claw 38 engages in the rack 29. Due to the elevation of the slide 30, the carriage 2 is also moved upwards. Once the inner control bolt 34 has reached its uppermost position, it leaves the abutment surface 32 so that the compression spring 39 pulls the slide 30 downwards. Immediately beforehand, an outer control bolt 35 moves into the vicinity of a rocker arm 33 as a result of which it swings the slide 30 to the right about the bolt 31 as a pivot so that the engaging nose 38 swings out of engagement with the rack 29. Hence, the downward movement of the slide 30 takes place without engagement of the engaging nose 38. Only when the outer control bolt 35 releases the rocker arm 33 does the slide 30 swing to the side and the engaging claw 38 moves under the next tooth of the rack 29. During the next revolution of the rotor 36, the carriage 2 is displaced by a distance corresponding to another tooth division. The rotor 36, in the form of a gearwheel, meshes with a pinion 37 driven by a motor 40, which may also control the operation of the carrier to pick the successive yarns.

The fork 17 is mounted on the slide 30 and is bent downwards at right angles so as to project through the opening 18 in the housing plate 1.

The motor 40 is set in operation by means of a control switch (not shown), which may be responsive to the timer controlling the testing arrangement, and remains switched on during the time it takes the rotor 36 to complete one revolution. On completion of this revolution, the yarn which hitherto has been involved in testing is cut through and the carriage 2 is moved forward by a distance corresponding to one division so that the next yarn is inserted into the testing apparatus and subjected to testing. At the end of the testing period allocated to each yarn sample, the rotor 36 makes another revolution so that one yarn after the other is automatically tested. After all the yarns have passed through, a limit switch can switch off the testing apparatus and the yarn changing mechanism can be supplied with new yarn samples.

The apparatus hereinbefore described is particularly applicable to a testing apparatus for determining the cross-sectional uniformity of yarns. Such an apparatus is, for example, illustrated in FIG. 5, wherein details of the apparatus are only described and illustrated insofar as they are of significance to the invention. An unwinding mechanism with two delivery rollers 103 and 104 is arranged in a housing 102 of the testing apparatus, which also accommodates a measuring unit 101 and the necessary electrical circuit elements. The top of the housing 102 carries the clamping support and cutting unit of the present invention for a number of yarns 11 to be tested in succession. The side of the housing carries a conveyor for gripping and inserting a yarn into the measuring unit 101 and into the unwinding mechanism 103, 104. This conveyor includes a rocker arm 107 and a yarn gripper 108 mounted on one end of the arm.

A time switch (not shown) sets a predetermined time interval during which yarn 11 from a spool is to be measured. At the end of this time interval, the rocker arm 107 begins to rotate from a starting position 107' and the yarn gripper 108 briefly opens and then closes to grip the leading yarn of a number of yarns clamped one behind the other. As the rocker arm 107 continues to rotate into its lowermost position 107'', the yarn is brought into the vicinity of the measuring unit 101 and at the same time, is inserted between the delivery rollers 103, 104 which are at this time briefly separated from one another. In order safely to introduce the yarn into the measuring unit 101 or, in the case of a capacitive testing instrument, into the measuring capacitor adapted to suit the particular yarn cross-section guide horns 111, 112 are provided on both sides of the measuring unit. These guide horns are mounted in displaceable slots. The horns are adjustable in relation to the measuring ranges selected by means of a knob 109.

After the yarn has been inserted a further brief opening of the clip 108 releases the yarn which is then run off from the spool by the delivery rollers 103, 104. The cutting attachment is actuated more or less simultaneously with the start of movement of the rocker arm 7 for inserting the next sample of yarn, as a result of which the sample of yarn being unwound uptill then is cut.

The measuring part of the testing apparatus (which is knwon per se) contains means for basically adjusting the results of measurement. A first basic adjustment or setting is the zero balance, i.e., the verification of a zero indication when the measuring unit 1 is empty. Various external or internal influences can cause the capacity of the measuring unit to undergo changes which produce the same indications as changes in the cross section of the yarn situated inside the measuring unit. For this reason, the indication has to be periodically checked when the measuring unit is empty. A switch controlled by the rocker arm 107 then actuates a balancing mechanism which checks the zero-point setting of the testing instrument during the period elapsing between departure of the preceding yarn sample and entry of the next yarn sample and corrects any deviations detected.

Another basic setting is the mean-value balance. Since every yarn has differences in its cross section that fluctuate about a mean value and since on the other hand the size of these fluctuations is related to the mean value of the yarn cross section, this mean value has first to be determined and kept constant by adjusting the electrical output. In the textile-testing apparatus according to the invention, this is achieved by virtue of the fact that after a yarn sample has been inserted and the testing cycle started, the mean value of the electrical output corresponding to the yarn cross section is automatically adjusted to a predetermined value and only thereafter is the size of the deviations in the yarn cross section from this mean value evaluated.

The design of circuits for the zero-point setting on the one hand and the mean value setting on the other hand, which circuits are provided in various conventional forms in the art, does not call for any particular effort on the part of the person skilled in the art and can therefore be assumed to be known.

I claim:
1. A yarn-changing mechanism for holding a number of yarns in position for conveyance in succession to a testing station, comprising clamping support means for holding said yarns at equally spaced intervals, yarn conveyor means for conveying each yarn successively from a conveying point to said testing station, advancing means for shifting said clamping support means by one yarn interval prior to each time said conveyor means is operated so as to bring said yarns successively to said conveying point for engagement with said yarn conveyor means, and cutting means, receiving each yarn conveyed to said testing station by said yarn conveyor means, for cutting through the tested yarn prior to operation of said yarn conveyor means to convey a new yarn thereto.

2. A yarn-changing mechanism as defined in claim 1 wherein said clamping support means includes at least one yarn clamp formed by a rod having a plurality of spring-biased cylinders mounted thereof so as to be axially slideable, said cylinders having a length which provided clamping openings therebetween for said yarns equal to said spaced intervals.

3. A yarn-changing mechanism as defined in claim 1 wherein said clamping support means includes a longitudinal base member and a plurality of yarn clamps mounted on said base member, said base member being mounted for longitudinal movement to bring said yarn clamps successively to said conveying point.

4. A yarn-changing mechanism as defined in claim 3 wherein said base member is provided with toothed rack and said advancing means includes a pawl mounted for engagement with said rack so as to displace said base member in incremental steps upon displacement thereof.

5. A yarn-changing mechanism as defined in claim 4 wherein said advancing means further includes cam means for displacing said pawl to advance said base member including a first rotating projection for longitudinally displacing said pawl and a second rotating projection for transversly displacing said pawl to disengage said pawl from said rack after longitudinal displacement thereof.

6. A yarn-changing mechanism as defined in claim 4 wherein connecting means is provided between said pawl and said cutting means so that said cutting means is actuated upon displacement of said pawl.

7. A yarn-changing mechanism as defined in claim 5 wherein said first and second rotating projections are mounted on a rotor, and further including a motor for driving said rotor and switch means for switching off said motor after each revolution of said rotor.

8. A yarn-changing mechanism as defined in claim 4 wherein said advancing means further includes cam means for displacing said pawl to advance said base member including a first rotating projection for longitudinally displacing said pawl.

* * * * *